Aug. 5, 1952     F. B. PORGES     2,606,045
MECHANICAL SEAL
Filed April 17, 1950     2 SHEETS—SHEET 1
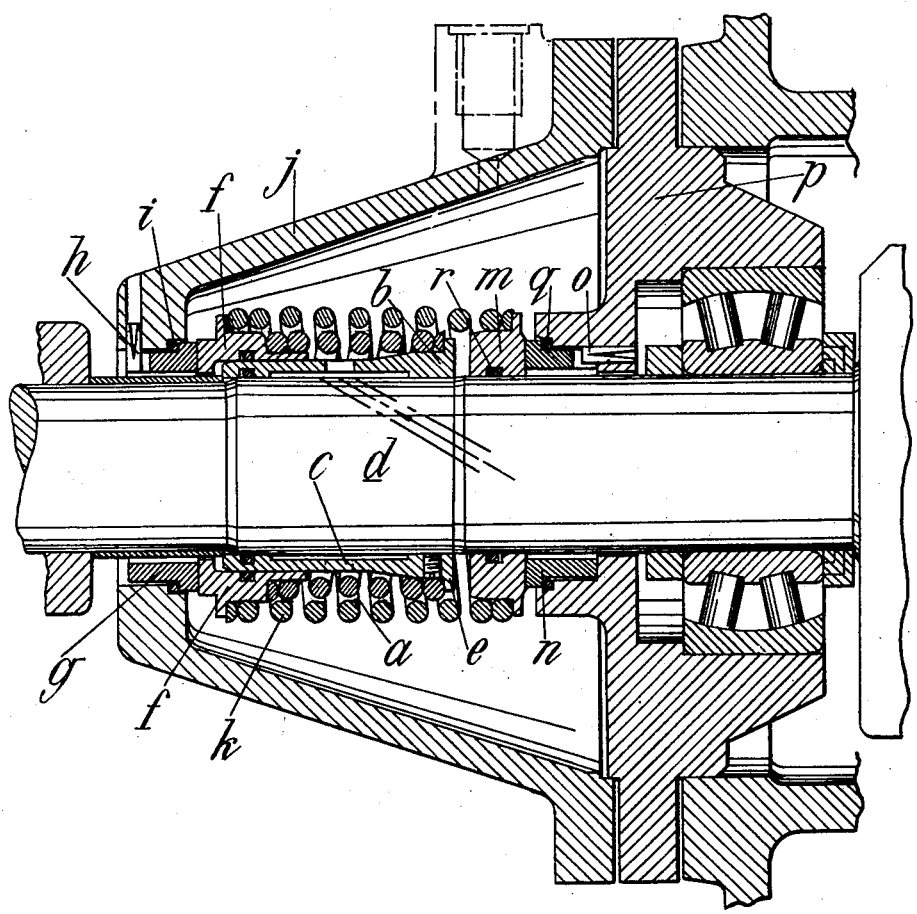
Inventor
F. B. Porges Aug. 5, 1952  F. B. PORGES  2,606,045
MECHANICAL SEAL
Filed April 17, 1950  2 SHEETS—SHEET 2
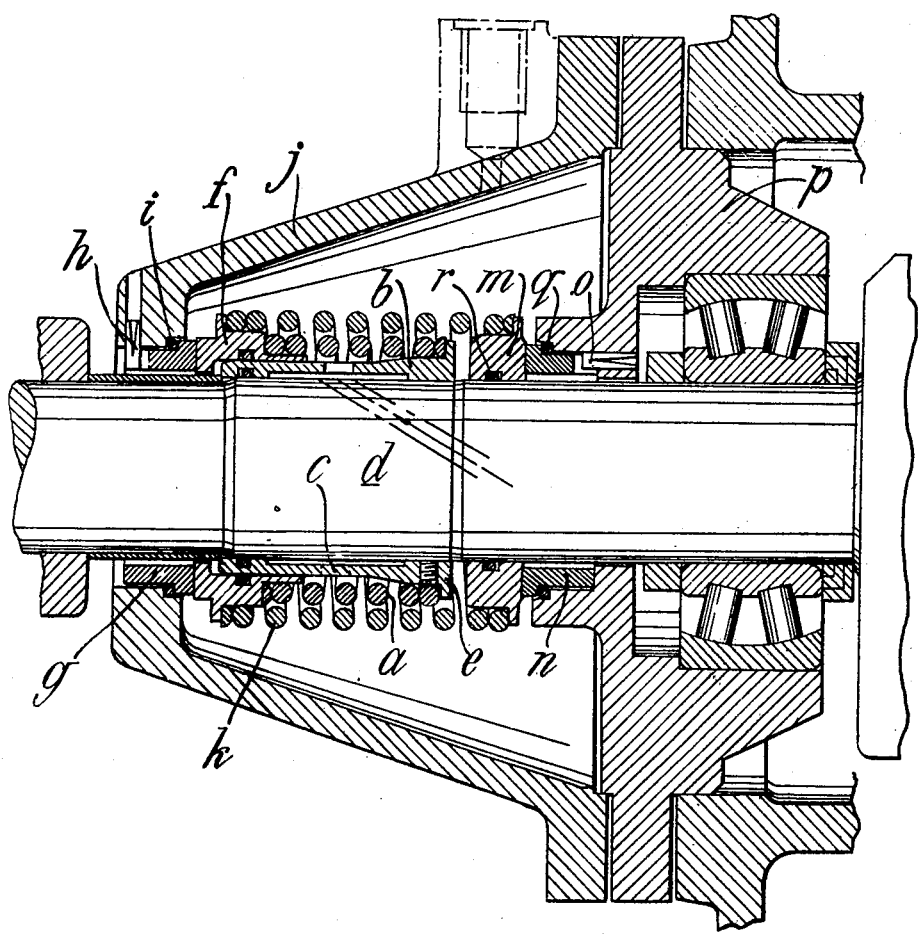
Inventor
F. B. Porges
By Hiscock Downing &etc
Attys Patented Aug. 5, 1952

2,606,045

UNITED STATES PATENT OFFICE 2,606,045

MECHANICAL SEAL

Frederick Benjamin Porges, Manchester, England, assignor to Flexibox Limited, Manchester, England, a British company Application April 17, 1950, Serial No. 156,250
In Great Britain May 2, 1949

2 Claims. (Cl. 286—11.15)

This invention is an improvement in or modification of the invention described and claimed in the specification of my Patent Reissue No. 23,189.

The invention consists in a mechanical seal arrangement comprising a duplex seal incorporating two rotary seal rings making rubbing contact with two fixed seal rings and a duplex coaxial coil spring arrangement, the inner coil spring loading and being an interference fit on one rotary seal ring and an interference fit on a driving part and the outer coil spring being an interference fit on both rotary seal rings.

The accompanying explanatory drawing is a longitudinal sectional view of a duplex mechanical seal constructed and arranged in accordance with this invention.

The inner coil spring $a$ is an interference fit on the larger diameter part $b$ of a sleeve $c$ which is secured to the shaft $d$ and has a flange $e$ at its end. The other end of the spring $a$ is an interference fit on the reduced diameter end of the rotary seal ring $f$ which makes rubbing contact (under the pressure of the spring $a$) with the stationary seal ring $g$ which is prevented from rotating by the pin $h$ entering a slot in the ring $g$. A seal $i$ makes a joint between the fixed seal ring $g$ and the housing $j$.

The rotary seal ring $f$ receives on its larger diameter portion one end of an outer coil spring $k$ which is an interference fit on the rotary seal ring $f$ so that it is driven by the latter. The other end of the spring $k$ is an interference fit on a second rotary seal ring $m$ which makes rubbing contact with a second fixed seal ring $n$ which is prevented from rotating by the pin $o$ fixed in the housing member $p$. A seal $q$ makes a joint between the second fixed seal ring $n$ and the housing member $p$.

A seal $r$ within a groove in the second fixed seal ring $m$ makes a joint between such ring and the shaft $d$. There are similar seals between the sleeve $c$ and the shaft $d$ and between the rotary seal ring $f$ and the external surface of the sleeve $c$.

It will be appreciated, therefore, that the driving torque for both seal rings $f$ and $m$ is transmitted from the shaft $d$ via the inner coil spring $a$ to the seal ring $f$ and from the latter by means of the outer coil spring $k$ to the second rotary seal ring $m$. This arrangement gives a compact and efficient construction.

By making the spring's interference fit on the parts within their opposite ends and by suitably arranging the hand (right or left) of the convolutions of the springs having regard to the normal direction of rotation of the parts driving the springs, I ensure that any tendency of either part driven by a spring to turn relatively to the driving part will cause such spring to be wound up and so more firmly closed upon the parts which are interference fits in its ends and thus resist such tendency.

What I claim is:

1. A mechanical seal arrangement comprising, in combination, a driving member, a fixed seal ring co-axial with said driving member, a rotary seal ring having contiguous portions of smaller and greater diameter, a compression coil spring which is an interference fit at one end upon said driving member and at the other end upon the smaller diameter portion of said rotary seal ring and presses the rotary seal ring against the fixed seal ring, a second fixed seal ring coaxial with said driving member, a second rotary seal ring, and a further compression coil spring disposed coaxially around the first mentioned coil spring and an interference fit at its ends upon the larger diameter portion of the first rotary seal ring and upon the second rotary seal ring respectively, said further spring pressing the second rotary seal ring against the second fixed seal ring.

2. A mechanical seal arrangement comprising, in combination, a rotary shaft, a sleeve having a flange at one end secured on said shaft, a housing around the shaft, a fixed seal ring around the shaft in the housing, means extending into the seal ring from the housing to prevent the seal ring revolving, and means making a joint between the housing and the fixed seal ring, a rotary seal ring which makes rubbing contact with the fixed seal ring, and has contiguous portions of smaller and larger diameter, a compression coil spring which at one end is an interference fit on the sleeve and at the other end is an interference fit on the smaller diameter portion of the rotary seal ring which it drives, a second fixed seal ring in a housing member, with means extending into the second fixed seal ring from the housing member to prevent the said second fixed seal ring from revolving, means making a joint between the second fixed seal ring and the housing member, a second rotary seal ring which makes rubbing contact with the second fixed seal ring, a further compression coil spring which is disposed coaxially around the first mentioned spring and is at one end an interference fit on the larger diameter portion of the first mentioned rotary seal ring and at the other end an interference fit on and so drives the second rotary seal ring and presses it against the second fixed seal ring.

FREDERICK BENJAMIN PORGES.

REFERENCES CITED

The following references are of record in the file of this patent:

UNITED STATES PATENTS

| Number | Name | Date |
|---|---|---|
| 2,455,700 | Porges | Dec. 7, 1948 |

FOREIGN PATENTS

| Number | Country | Date |
|---|---|---|
| 508,487 | Germany | of 1930 |